United States Patent [19]

Landt

[11] Patent Number: 4,657,459

[45] Date of Patent: Apr. 14, 1987

[54] VIBRATION RESISTANT FASTENERS

[75] Inventor: Richard C. Landt, Souderton, Pa.

[73] Assignee: SPS Technologies, Inc., Newtown, Pa.

[21] Appl. No.: 680,212

[22] Filed: Dec. 10, 1984

[51] Int. Cl.$^4$ .................... F16B 39/282; F16B 41/00
[52] U.S. Cl. .................... 411/188; 411/911; 411/332; 411/531
[58] Field of Search ............ 411/188, 184, 185, 186, 411/187, 176, 31, 332, 911, 531, 160, 161, 162, 957

[56] References Cited

U.S. PATENT DOCUMENTS

| | | | |
|---|---|---|---|
| 752,628 | 2/1904 | Miner | 411/188 |
| 1,143,091 | 6/1915 | Stimpson | 411/545 |
| 1,668,025 | 5/1928 | Olson | 411/957 X |
| 2,012,032 | 8/1935 | Zinnbauer | 411/160 X |
| 2,037,586 | 4/1936 | Olson | 411/188 |
| 2,041,568 | 5/1936 | Olson | 411/957 X |
| 2,112,494 | 3/1938 | Olson | 411/187 |
| 2,128,757 | 8/1938 | Olson | 411/187 |
| 2,147,209 | 2/1939 | Olson | 411/187 |
| 2,147,211 | 2/1939 | Olson | 411/187 |
| 3,605,845 | 9/1971 | Junker | 411/185 |
| 3,825,051 | 7/1974 | Sigmund | 411/188 |
| 4,103,725 | 8/1978 | Abe | 411/160 |
| 4,294,300 | 10/1981 | Bouwman | 411/188 X |

FOREIGN PATENT DOCUMENTS

| | | | |
|---|---|---|---|
| 2042680 | 7/1972 | Fed. Rep. of Germany | 411/176 |
| 2065204 | 12/1972 | Fed. Rep. of Germany | 411/176 |
| 2822928 | 11/1979 | Fed. Rep. of Germany | 411/176 |

Primary Examiner—Gary L. Smith
Assistant Examiner—Adrian H. Whitcomb, Jr.
Attorney, Agent, or Firm—Aaron Nerenberg; Stephen Krefman

[57] ABSTRACT

A self-locking fastener having a bearing surface comprising a plurality of sets of serrations arranged to penetrate a workpiece such that, while a resistance to the loosening of the fastener from the workpiece is created, the marring of the workpiece surface is minimized. Use of the fastener is particularly advantageous if the workpiece consists of soft materials such as cast-aluminum or non-heat treated carbon steels. Each set of serration, when viewed as a profile, includes a downwardly inclined surface, a relatively deeper serration and a relatively shallower intermediate serration. The intermediate serration controls the depth of the penetration into a workpiece.

28 Claims, 6 Drawing Figures

VIBRATION RESISTANT FASTENERS

BACKGROUND OF THE INVENTION

1. Field of the Invention

The present invention relates to self-locking fasteners and, in particular, to bolts, nuts, washers and the like having serrated bearing surfaces that provide resistance against the fastener becoming loosened unintentionally after it has been seated. The self-locking fastener of the present invention can be used to particular advantage for workpieces having relatively soft bearing surfaces whereby marring of the workpiece surface is minimized.

2. Description of the Prior Art

A serious problem in joints secured together by threaded members is the possibility of joint separation due to a nut backing-off from a bolt or a bolt backing-out from a nut or other internally threaded member. Generally, this result can occur when the joint is subjected to vibrations.

Various proposals have been suggested in the past to either eliminate or greatly reduce the unintentional loosening of threaded members. Because of the wide variety of applications in which this undesirable result can occur, many different types of locking devices have been developed. One approach has been to treat the bearing surface of the fastener in such a manner that the resistance to relative rotation between the fastener and a workpiece in which the fastener is installed is greater than the resistance to relative movement between the mating threads. As a result, the resistance to rotation between the mating threaded parts no longer is the critical factor in determining whether the threaded parts will turn relative to each other.

One important requirement of these fasteners is that the "off" torque (torque required to loosen a tightened fastener) be greater than the "on" torque (torque required to seat a fastener properly.)

Because the bearing surface of these fasteners, for the most part, are serrated or are provided with teeth or the like which are arranged to dig into the workpiece to create resistance to relative rotation between the fastener and the workpiece, some damage or marring of the workpiece bearing surface will occur as these fasteners are seated and removed. Such damage to the workpiece causes it to weaken. Hence, a second important requirement of these fasteners is that the effect of marring or damage to the workpiece is minimized.

Generally, most prior art fasteners provided with a locking characteristic in the bearing surface fail to satisfy concurrently these and other requirements. Those fasteners available at the present time having improved "off" torque to "on" torque ratios dig into the workpiece in such a manner or to such an extent as to weaken greatly the workpiece. "Notch" effect (the build up of stress concentrations) is a common result and may cause fatigue failure of the clamped parts. This problem becomes more acute as the thickness of the workpiece is reduced. Those fasteners available at the present time having reduced adverse effect on the workpiece provide insufficient "off" torque.

The drawbacks of this type of prior art fastener are overcome in a fastener such as that disclosed in commonly assigned U.S. Pat. No. 3,605,845. This patent discloses a self-locking fastener which provides a resistance to unintended rotation between the fastener and the workpiece and yet causes a minimum amount of marring of the workpiece surface with which the fastener bearing surface is in contact. This is accomplished by providing a smooth surface annular ring about a plurality of radially disposed serrations which, upon engagement with the workpiece, opposes further penetration of the serrations and controls the extent of penetration of the serrations.

A similar improved fastener is also disclosed in commonly assigned U.S. Pat. No. 3,825,051. This patent discloses a self-locking fastener having a polygon shaped workpiece bearing surface, such as a hex-head, where the serrated segment is formed within an annular segment so that circumferentially discontinuous smooth-faced outer bearing surfaces are formed across adjacent flats of the polygon configuration.

Thus, it is an object of the present invention to provide a new and improved self-locking fastener having a locking mechanism included in the bearing surface of the fastener and which is also provided with a stress regulating configuration within the locking mechanism to control the extent of penetration of the fastener into the workpiece.

It is another object of the present invention to provide a self-locking fastener of this type which provides improved resistance to unintended rotation between the fastener and a workpiece and yet causes a minimum amount of marring of the workpiece surface with which it is in contact.

It is a further object of the present invention to provide a self-locking fastener which is relatively simple in construction and inexpensive to fabricate.

SUMMARY OF THE INVENTION

The self-locking fastener of the present invention has a bearing surface with a plurality of serrations. The serrations, when viewed along a cylinder concentric with the longitudinal axis of the fastener, have the appearance of teeth. Between two teeth are a plurality of intermediate surfaces. The level of the intermediate surfaces, relative to the teeth, is between the crest and root of the teeth. In one preferred embodiment each section comprises an inclined plane starting at the crest of a tooth and proceeding downwardly in the direction of tightening to an intermediate level forming the intermediate surface, which can be considered generally parallel to the bearing surface, and then a second inclined plane extending downwardly in the direction of tightening from the intermediate surface to the root of the tooth. The intermediate surface reduces the marring of the workpiece by the teeth, yet sufficient resistance to vibration exists to prevent unintentional loosening of the fastener.

BRIEF DESCRIPTION OF THE DRAWINGS

FIGS. 3 and 4 show an intermediate surface which minimizes any marring damage.

DESCRIPTION OF THE PREFERRED EMBODIMENT

The aforementioned objects and other objects of the present invention will be more fully understood after consideration of the following description taken in connection with the accompanying drawngs.

Figure 1:
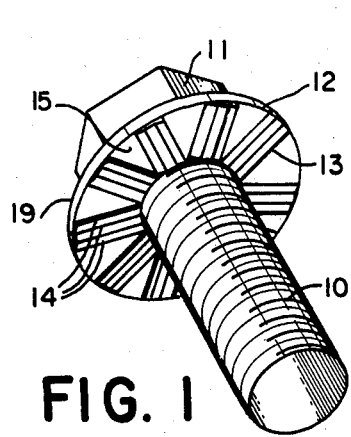
FIG. 1 provides a perspective view of a self-locking bolt constructed in accordance with the present invention.

Referring to FIG. 1, a self-locking bolt constructed in accordance with the present invention includes a threaded shank 10, and a bolt head 11 at one end of shank 10. Bolt head 11 has a bearing flange 12. The bearing surface of flange 12, that is the surface to be placed in bearing contact against a workpiece (not shown), is provided with a plurality of outwardly disposed serrations 13. In this embodiment the serrations form sets of preferably two, for example serrations 14, which are parallel to each other leaving a wedge-shaped portion, for example 15, between the sets. Serration sets are defined as the surfaces represented in FIG. 1 by four parallel lines.

In another embodiment (not shown) the bearing surface of flange 12 may include a plurality of radially disposed serrations rather than the parallel serration sets 14.

Figure 2:
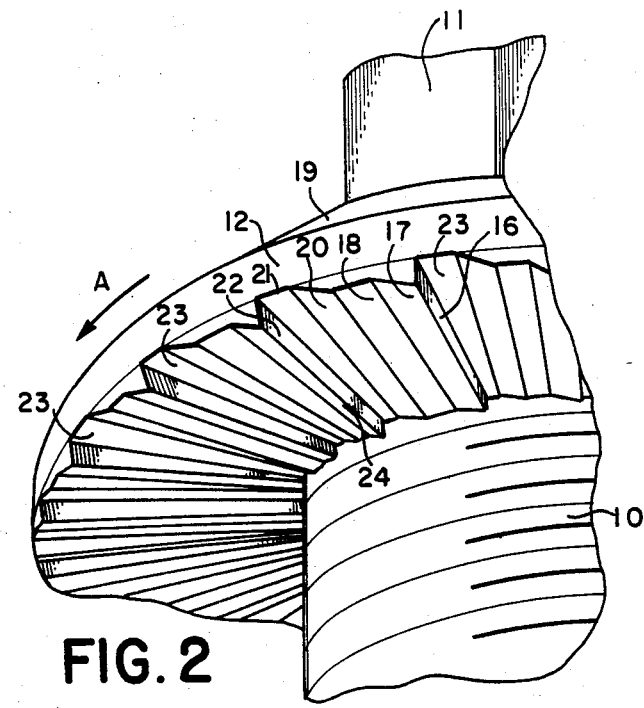
FIG. 2 provides an enlarged portion of the perspective view of the self-locking bolt shown in FIG. 1.

Referring to FIG. 2, which is an enlarged portion of the perspective view of the self-locking bolt shown in FIG. 1, the bolt head 11 is formed at one end of threaded shank 10 and includes bearing flange 12 and the direction of tightening is indicated by the arrow A. The bearing surface of flange 12 has, in this embodiment, outwardly disposed serrations. When viewed along a cylinder concentric with the longitudinal axis of the fastener, the crest of a tooth is represented by 16. A downwardly inclined surface 17 starts at crest 16 and ends at one end of an intermediate parallel surface 18. Surface 18 can be considered generally parallel to the bearing surface of flange 12 or the non-bearing top surface 19 of flange 12. A second downwardly inclined surface 20 starts at the other end of parallel surface 18 and extends downwardly in the direction of tightening to a root 21 of the next tooth. Root 21 of the next tooth is connected by a wall 22, which is generally parallel to the longitudinal axis of the bolt, to the crest 24 of that tooth. Because the serrations in this embodiment are parallel to each other, a pie-shaped wedge 23 separates successive parallel sets. Three pie-shaped wedges 23 are shown to illustrate this feature of the first embodiment. Each pie-shaped wedge 23 is at the same plane as root 21. Although wall 22 can generally be considered to be 90° to the plane of the bearing surface, variations from 90° are acceptable.

Figure 3:
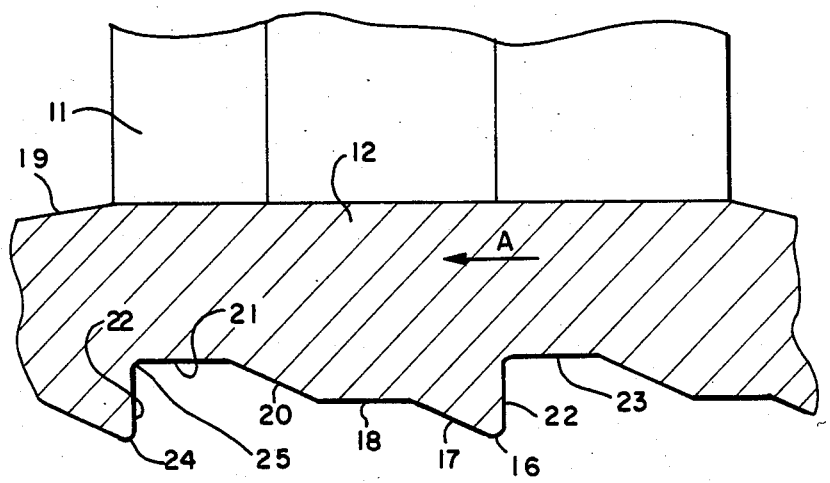
FIG. 3 provides an enlarged portion of a cross sectional view of one embodiment of the plurality of serrations between two teeth of the self-locking bolt of FIGS. 1 and 2.

FIG. 3 is an enlarged cross sectional view of one set of serrations shown in FIG. 2. From the crest 16 of the tooth, downwardly inclined surface 17 proceeds in the direction of tightening to one end of intermediate parallel surface 18. As previously described, the surface 18 is generally parallel to bearing flange 12. The surface 18 is at a shallower depth, compared to crests 16 or 24, than the greater depth of root 21. From the other end of intermediate parallel surface 18, an inclined surface 20 extends downwardly in the tightening direction to root 21 of the adjacent tooth. The wall 22 extends from the root 21 to the crest 24 of the adjacent tooth. The surfaces 17, 18, 20, 21 and 22 along with the crest 16 can be considered as one set of serrations. When viewed at a right angle to the surface 18, the set consists of four parallel lines.

FIG. 3 also shows another feature of the present embodiment of the invention. The root 21 is connected to wall 22 by a radius or fillet 25, which is not considered essential to the present invention. The crests 16 and 24 are also preferably radiused rather than having sharp edges.

Figure 4:
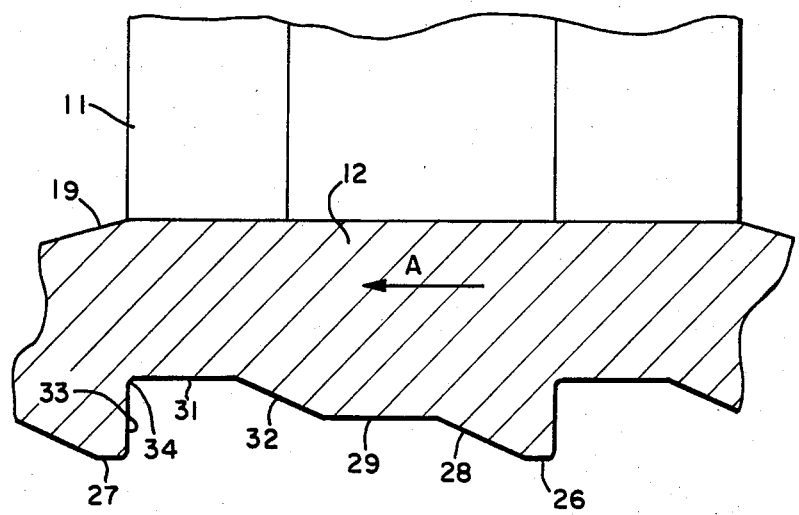
FIG. 4 provides an enlarged portion of a cross sectional view of another embodiment of the plurality of serrations between two teeth. Both

FIG. 4 is an enlarged cross sectional view of one set of serrations of another embodiment of the invention. The embodiment of FIG. 4 differs from the one shown in FIG. 3 in that the crests 26 and 27 of the teeth are truncated with small flats. A downwardly inclined surface 28 starts at a truncated crest 26 and extends in the direction of tightening to the one end of an intermediate surface 29 that is generally parallel to the bearing surface of flange 12. The intermediate surface 29 is at a level between that of crest 26 and a root 31. Another downwardly inclined surface 32 begins at the other end of surface 29 and extends in the direction of tightening to root 31. Surfaces 26, 28, 29, 31, 32 and 33 can be considered as one set of serrations in this embodiment. Also shown in FIG. 4 is a fillet 34 which connects a root 31 with a wall 33 that is generally perpendicular to the surface of flange 12. Fillet 34, however, is not considered essential to this embodiment of the invention.

Figure 5:
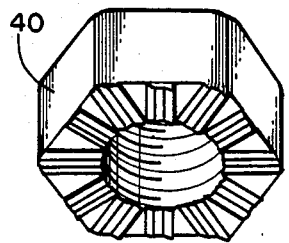
FIG. 5 provides a perspective view of a self-locking nut constructed in accordance with the present invention.

FIG. 5 shows the invention described above in the form of a nut 40.

Figure 6:
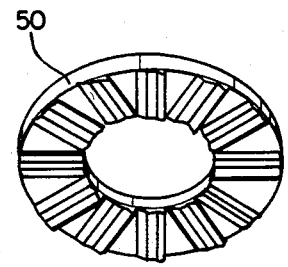
FIG. 6 provides a perspective view of a self-locking washer constructed in accordance with the present invention.

FIG. 6 shows the invention described above in the form of a washer 50.

In general, the present invention provides means for limiting the fastener's serrations from penetrating too deeply into the mating surface of the workpiece (not shown) while still providing "off" torques which are greater than "on" torques. This control is provided by the intermediate shallower parallel surfaces (for example 18 in FIG. 3, and 29 in FIG. 4). As the fastener is seated, the crests 16, 26 of the serrations engage the mating surface of the workpiece (not shown) and begin to penetrate the workpiece. Penetration continues until parallel surfaces 18, 20 contact the mating surface of the workpiece. At this point the total bearing area in contact at the mating surface will be sufficient to resist further penetration.

Parallel surfaces 18, 29 can be considered intermediate surfaces which are closer in the axial direction of the fastener to the non-bearing surface 19 of the bolt than are the crests of the teeth and which are further in the axial direction of the fastener from the non-bearing surface of the bolt than are the roots of the teeth. As a result of the relative location of the intermediate surfaces, the teeth are adapted to penetrate into a mating workpiece surface in which the bolt is being installed, and the intermediate surfaces are adapted to control and limit the extent of penetration of the teeth into the workpiece surface when the fastener is operationally installed with the roots of the teeth not bearing against the workpiece surface.

In particular the fasteners of the present invention are more suitable for use on workpieces consisting of soft material such as cast-aluminum or non-heat-treated carbon steel.

While the serrations have been disclosed and described as originating from the same point on the longitudinal axis of the fastener, or as being parallel to each other in sets with each set being separated by a pie-shaped wedge, it is to be expressly understood that 5 different orientations for the disclosed serrations of present invention may also be employed with equally beneficial results.

What is claimed is:

1. A self-locking fastener having a predetermined direction of tightening and a bearing surface, said bearing surface comprising:
    a plurality of serrations in the form of teeth when viewed along a cylinder concentric with the longitudinal axis of the fastener, each of said teeth having a root and a crest such that said roots of said teeth generally form a first plane and said crests of said teeth generally form a second plane;
    a wall extending from the crest of each said tooth to the root of said tooth; and
    a plurality of intermediate surfaces each being disposed between two of said teeth; said intermediate surfaces being generally disposed between said first and second planes and generally parallel thereto; and
    and inclined surface extending from each of said crests in the direction of tightening to one of said intermediate surfaces, such that said teeth are adapted to penetrate into a work-piece surface in which said self-locking fastener is being installed and said intermediate surfaces are adapted to control and limit the extent of penetration of said teeth into the work-piece surface when said self-locking fastener is operatively installed and said roots of said teeth do not bear against said workpiece surface.

2. The self-locking fastener of claim 1 wherein a said bearing surface further comprises a plurality of second inclined surfaces each extending in the direction of tightening from one of said intermediate surfaces to one of said roots.

3. The self-locking fastener of claim 1 wherein a said bearing surface further comprises a plurality of second inclined surfaces each extending in the direction of tightening from one of said intermediate surfaces to one of said roots.

4. The self-locking fastener of claim 1 wherein said crests are selected from a group consisting of radiused crests and truncated crests.

5. The self-locking fastener of claim 1 wherein said crests of said teeth each define a straight radial line originating from the same point on the longitudinal axis of the fastener.

6. The self-locking fastener of claim 1 wherein said serrations are parallel to each other in sets and each set is separated by a pie-shaped wedge.

7. The self-locking fastener of claim 6 wherein each said pie-shaped wedge is disposed generally within said first plane.

8. The self-locking fastener of claim 1 wherein said fastener is a bolt.

9. The self-locking fastener of claim 1 wherein said fastener is a nut.

10. The self-locking fastener of claim 1 wherein said fastener is a washer.

11. A self-locking fastener comprising a bolt having a threaded shank defining a predetermined direction of tightening, a bolt head at a first end of said shank, and an annular bearing surface formed on said bolt head and extending generally from said shank to the periphery of said head, said bearing surface further comprising:
    a self-locking fastener having a predetermined direction of tightening and a bearing surface, said bearing surface comprising:
    a plurality of serrations in the form of teeth when viewed along a cylinder concentric with the longitudinal axis of the fastener, each of said teeth having a root and a crest such that said roots of said teeth generally form a first plane and said crests of said teeth generally form a second plane;
    a wall extending from the crest of each said tooth to the root of said tooth; and
    an inclined surface extending from each of said crests in the direction of tightening to one of said intermediate surfaces, such that said teeth are adapted to penetrate into a work-piece surface in which said self-locking fastener is being installed and said intermediate surfaces are adapted to control and limit the extent of penetration of said teeth into the work-piece surface when said self-locking fastener is operatively installed and said roots of said teeth do not bear against said workpiece surface; and
    a plurality of intermediate surfaces each being disposed between two of said teeth; said intermediate surfaces being generally disposed between said first and second planes and generally parallel thereto.

12. The self-locking fastener of claim 11 wherein a said bearing surface further comprises a plurality of second inclined surfaces each extending in the direction of tightening from one of said intermediate surfaces to one of said roots.

13. The self-locking fastener of claim 11 wherein a said bearing surface further comprises a plurality of second inclined surfaces each extending in the direction of tightening from one of said intermediate surfaces to one of said roots.

14. The self-locking fastener of claim 11 wherein said crests are selected from a group consisting of radiused crests and truncated crests.

15. The self-locking fastener of claim 11 wherein said crests of said teeth each define a straight radial line originating from the same point on the longitudinal axis of the fastener.

16. The self-locking fastener of claim 11 wherein said serrations are parallel to each other in sets and each set is separated by a pie-shaped wedge.

17. A self-locking fastener comprising nut having a nut body, a threaded bore extending at least partially through said nut body and defining a predetermined direction of tightening, and a bearing surface formed on said nut body and extending generally from said threaded bore to the periphery of said nut body, said bearing surface comprising:
    a plurality of serrations in the form of teeth when viewed along a cylinder concentric with the longitudinal axis of the fastener, each of said teeth having a root and a crest such that said roots of said teeth generally form a first plane and said crests of said teeth generally form a second plane;
    a wall extending from the crest of each said tooth to the root of said tooth;
    a plurality of intermediate surfaces each being disposed between two of said teeth; said intermediate surfaces being generally disposed between said first and second planes; and generally parallel thereto and an inclined surface extending from each of said crests in the direction of tightening to one of said intermediate surfaces, such that said teeth are adapted to penetrate into a work-piece surface in which said self-locking fastener is being installed and said intermediate surfaces are adapted to control and limit the extent of penetration of said teeth into the work-piece surface when said self-locking fastener is operatively installed and said roots of said teeth do not bear against said workpiece surface.

18. The self-locking fastener of claim 17 wherein a said bearing surface further comprises a plurality of second inclined surfaces each extending in the direction of tightening from one of said intermediate surfaces to one of said roots.

19. The self-locking fastener of claim 17 wherein a said bearing surface further comprises a plurality of second inclined surfaces each extending in the direction of tightening from one of said intermediate surfaces to one of said roots.

20. The self-locking fastener of claim 17 wherein said crests are selected from a group consisting of radiused crests and truncated crests.

21. The self-locking fastener of claim 17 wherein said crests of said teeth each define a straight radial line originating from the same point on the longitudinal axis of the fastener.

22. The self-locking fastener of claim 17 wherein said serrations are parallel to each other in sets and each set is separated by a pie-shaped wedge.

23. A self-locking fastener comprising a washer having a washer body, a bore extending through said washer body, and a bearing surface formed on said washer body and extending generally from said bore to the periphery of said washer body, said bearing surface defining a predetermined direction of tightening and further comprising:
 a plurality of serrations in the form of teeth when viewed along a cylinder concentric with the longitudinal axis of the fastener, each of said teeth having a root and a crest such that said roots of said teeth generally form a first plane and said crests of said teeth generally form a second plane;
 a wall extending from the crest of each said tooth to the root of said tooth;
 a plurality of intermediate surfaces each being disposed between two of said teeth; said intermediate surfaces being generally disposed between said first and second planes; and generally parallel therto and
 an inclined surface extending from each of said crests in the direction of tightening to one of said intermediate surfaces, such that said teeth are adapted to penetrate into a work-piece surface in which said self-locking fastener is being installed and said intermediate surfaces are adapted to control and limit the extent of penetration of said teeth into the work-piece surface when said self-locking fastener is operatively installed and said roots of said teeth do not bear against said workpiece surface.

24. The self-locking fastener of claim 23 wherein a said bearing surface further comprises a plurality of second inclined surfaces each extending in the direction of tightening from one of said intermediate surfaces to one of said roots.

25. The self-locking fastener of claim 23 wherein a said bearing surface further comprises a plurality of second inclined surfaces each extending in the direction of tightening from one of said intermediate surfaces to one of said roots.

26. The self-locking fastener of claim 23 wherein said crests are selected from a group consisting of radiused crests and truncated crests.

27. The self-locking fastener of claim 23 wherein said crests of said teeth each define a straight radial line originating from the same point on the longitudinal axis of the fastener.

28. The self-locking fastener of claim 23 wherein said serrations are parallel to each other in sets and each set is separated by a pie-shaped wedge.

* * * * *